United States Patent
Puimedon

(10) Patent No.: US 9,825,808 B2
(45) Date of Patent: Nov. 21, 2017

(54) NETWORK CONFIGURATION VIA ABSTRACTION COMPONENTS AND STANDARD COMMANDS

(71) Applicant: Red Hat Israel, Ltd., Raanana (IL)

(72) Inventor: Antoni Segura Puimedon, Brno (CZ)

(73) Assignee: Red Hat Israel, Ltd., Raanana (IL)

( * ) Notice: Subject to any disclaimer, the term of this patent is extended or adjusted under 35 U.S.C. 154(b) by 333 days.

(21) Appl. No.: 14/188,306

(22) Filed: Feb. 24, 2014

(65) Prior Publication Data

US 2015/0244566 A1    Aug. 27, 2015

(51) Int. Cl.
    *H04L 12/24*    (2006.01)

(52) U.S. Cl.
    CPC ...... *H04L 41/0803* (2013.01); *H04L 41/0816* (2013.01); *H04L 41/0893* (2013.01)

(58) Field of Classification Search
    CPC ........................ H04L 41/0803; H04L 41/0893
    See application file for complete search history.

(56) References Cited

U.S. PATENT DOCUMENTS

| | | | | |
|---|---|---|---|---|
| 6,959,332 B1* | 10/2005 | Zavalkovsky | ...... | H04L 41/0893 709/223 |
| 2002/0178246 A1* | 11/2002 | Mayer | ................ | H04L 41/0893 709/223 |
| 2004/0088142 A1* | 5/2004 | Ashley | ................ | H04L 41/0253 702/184 |
| 2006/0277603 A1* | 12/2006 | Kelso | .................... | H04L 41/082 726/13 |
| 2007/0268516 A1* | 11/2007 | Bugwadia | ............... | H04L 67/34 358/1.15 |
| 2008/0107131 A1* | 5/2008 | Ma | ...................... | H04L 41/0803 370/468 |
| 2013/0055270 A1* | 2/2013 | Dabagh | ............... | G06F 15/1735 718/102 |
| 2015/0169340 A1* | 6/2015 | Haddad | ............... | G06F 9/45533 718/1 |

* cited by examiner

Primary Examiner — Jeong S Park
(74) Attorney, Agent, or Firm — Lowenstein Sandler LLP

(57) ABSTRACT

An apparatus receives a request to establish a networking configuration. The apparatus creates one or more networking abstraction components, wherein the created networking abstraction components represent the networking configuration to be established. The apparatus sends, via the one or more networking abstraction components, one or more standard commands. The apparatus produces, in response to the standard commands, an implementation corresponding to the networking configuration.

20 Claims, 8 Drawing Sheets

NETWORK CONFIGURATION VIA ABSTRACTION COMPONENTS AND STANDARD COMMANDS

TECHNICAL FIELD

This disclosure relates to the field of virtualization and, in particular, to the provision of networking configurations.

BACKGROUND

In a virtualization environment, networking configurations may be employed to provide virtual machines access to, for instance, network interface cards, bonds, bridges, and/or virtual Local Area Networks (vLANs).

However, such employ of networking configurations typically involves a strong coupling to the implementation approach underlying the networking configuration. Moreover, attempts to comprehend a networking configuration via inspection of its underlying implementation (e.g., via one or more configuration files) may end in confusion or misunderstanding.

BRIEF DESCRIPTION OF THE DRAWINGS

The present disclosure is illustrated by way of example, and not by way of limitation, in the figures of the accompanying drawings.

DETAILED DESCRIPTION

Figure 1:
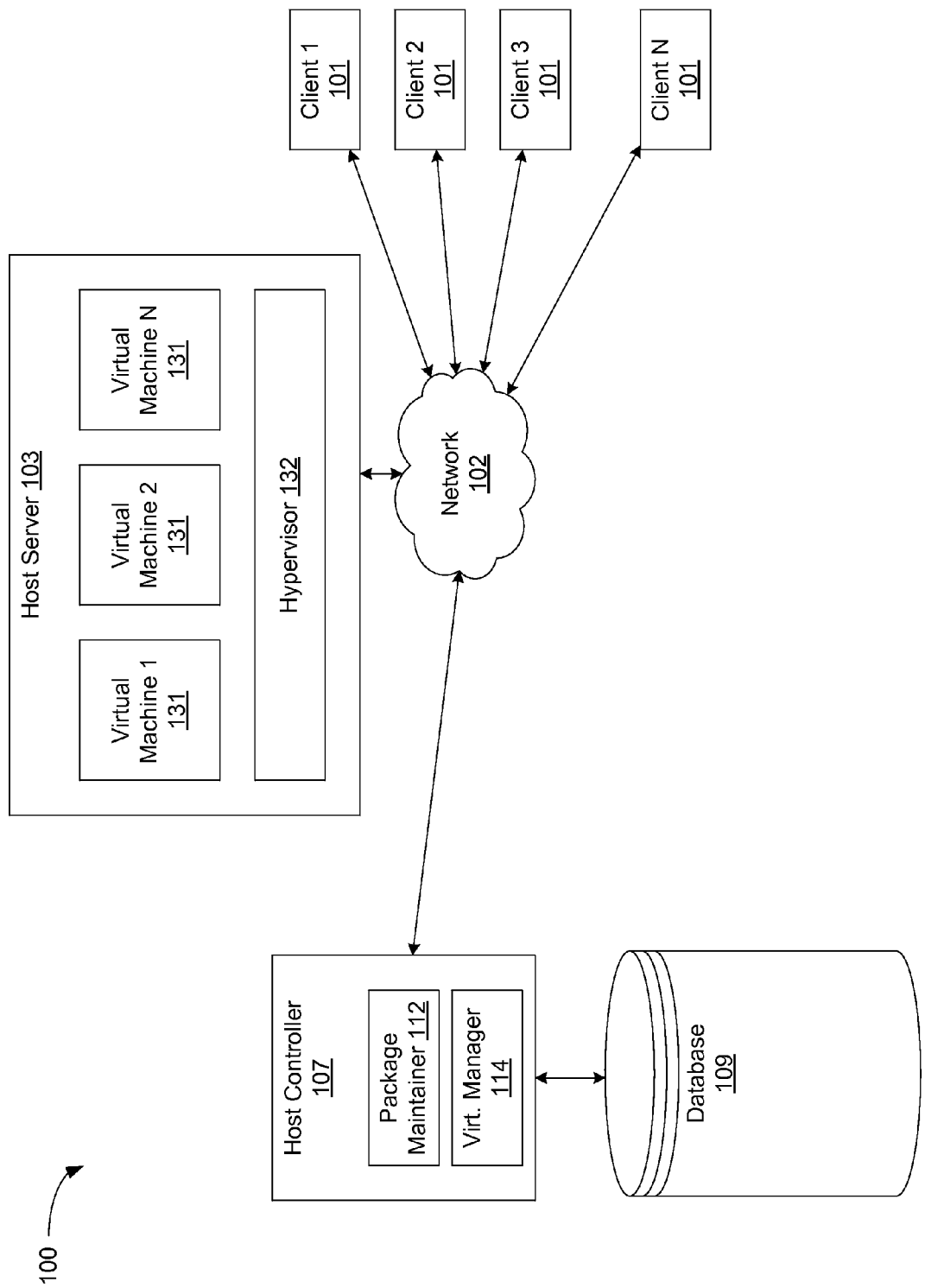
FIG. 1 illustrates an example network architecture in which examples of the present invention may operate.

In a virtualization environment, networking configurations may be employed to provide virtual machines access to, for instance, network interface cards (NICs), bonds, bridges, and/or vLANs. For instance, vLANs may be employed to provide virtual machines network access which is organized into logical groupings, and access to bonds and/or NICs may allow virtual machines broader network access (e.g., to the internet).

However, such employ of networking configurations typically involves a strong coupling to the implementation approach underlying the networking configuration. For instance, such strong coupling may establish an inertia against moving away from a legacy underlying implementation to another underling implementation, even where benefits may accrue by doing so. Moreover, attempts to comprehend a networking configuration via inspection of its underlying implementation may end in confusion or misunderstanding, with configuration files and the like often presenting network-related information in disorganized and/or dispersed fashions.

Set forth herein are examples of approaches by which networking configurations can be provided while avoiding such unpleasantries. According to an example, standard commands, which yield implementations of networking configurations, may be established. For instance, the standard commands may yield networking configurations corresponding to network elements such as network interface cards (NICs), bonds, bridges, and/or virtual Local Area Networks (vLANs). The commands may provide for creation, modification, and/or deletion of such elements. A recipient of such a standard command may have freedom in choice of implementation approach, so long as an adopted approach results in meeting that which is called for by the standard command. For example, one recipient of a standard command may employ a legacy implementation approach, while another recipient of a standard command may employ a non-legacy approach. As such, for instance, decoupling from implementation approach may be achieved. As one illustration, the sender of a standard command may be shielded from the approach employed in responding to the command (e.g., legacy versus non-legacy). As another illustration, transitioning from one implementation approach (e.g., from a legacy approach) to another implementation approach (e.g., to a non-legacy approach) may be facilitated. Standard commands, as one example, might be agreed-upon by one or more parties, and/or made available for access (e.g., to allow for establishment of standard command recipients).

Moreover, according to an example networking abstraction components may be employed to allow for the representation of networking configuration in a way decoupled from underlying implementation. Networking abstraction components may be provided for one or more network elements (e.g., NICs, bonds, bridges, and/or VLANs). The networking abstraction components may be capable of holding relevant data (e.g., port connections of a bridge or a tag of a vLAN), and/or of sending standard commands (e.g., to provide for the establishment of relevant underlying implementation). Moreover, the representation afforded by the employ of networking abstraction components may allow for networking configurations to be more easily understood.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these example-only details and still be contemplated to be within the scope of the present invention.

FIG. 1 illustrates an example network architecture 100 in which examples of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via the same or a different network or directly). Host controller 107 may be an independent machine such as a server computer, a desktop computer, a virtual machine, etc. Alternatively, the host controller 107 may be part of the host servers 103. In one example, the network architecture 100, including host controller 107, host servers 103 and clients 101, may be referred to as a virtualization environment.

In one example, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM) or a kernel-based hypervisor. As discussed in greater detail hereinbelow, hypervisor 132 may perform operations including receiving, from virtualization manager 114, requests for the establishment of networking configurations presentable to one or more virtual machines of hypervisor 132, and acting to fulfill those requests.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one example, virtual disks may form a whole or part of a logical data center. In one example, virtual machines 131 and virtual disks, together with host servers 103, may be collectively referred to as entities in a virtual machine system.

The virtual machines 131 and virtual disks are managed by the host controller 107. Host controller 107 may manage the allocation of resources from host server 103 to virtual machines 131. In addition, host controller may monitor the status of virtual machines 131 as well as the progress of commands and processes being executed by virtual machines 131 and/or on virtual machines 131. The host controller 107 may include a virtualization manager 114 to perform management operations in the virtualization system, including for example allocating resources of host servers 103 to virtual machines 131, monitoring the status of virtual machines 131, monitoring the progress of commands and processes being executed by virtual machines 131, etc. As discussed in greater detail hereinbelow, virtualization manager 114 may perform operations including dispatching, to hypervisor 132, requests for the establishment of networking configurations presentable to one or more virtual machines of hypervisor 132.

The host controller 107 may also maintain a management database 109 used by the virtualization manager 114 for the above management operations.

In one example, host controller 107 also includes a package maintainer 112 to install, upgrade, or configure software packages on the host server 103 and/or on the host controller 107 in a consistent manner. For example, the package maintainer 112 may be used to install or upgrade the virtualization manager 114 on the host controller 107. As another example, the package maintainer 112 may be used to install packages on one or more host servers 103 during deployment thereof.

With further regard to FIG. 1, as an example a VM 131, hosted by hypervisor 132, may be a consumer, and the external service may be networking as a service. As another example hypervisor 132 may be a consumer and the external service may be storage as a service which may be employed by the hypervisor for accessing disk images of virtual machines hosted by the hypervisor. As a further example, virtualization manager 114 may be a consumer and the external service may be VM hosting as a service which may be employed by the virtualization manager as a source of virtual machine hosts to be subject to its management (e.g., hosts to which virtual machines can be deployed).

Figure 2A:
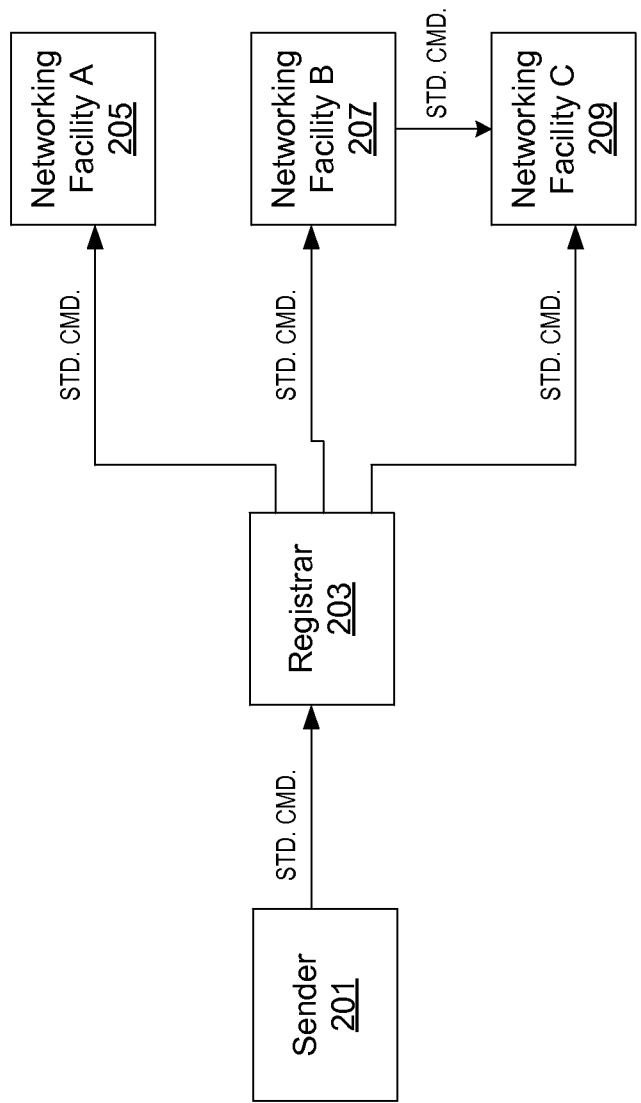
FIG. 2A illustrates a standard command handling approach, according to an example.

FIG. 2A illustrates one example of a standard command handling approach. The approach may be performed by processing logic that comprises hardware (e.g., circuitry, dedicated logic, programmable logic, microcode, etc.), software (such as instructions run on a processing device), or a combination thereof. As one example, the approach may be performed by hypervisor running on a computing device. For instance, the method may be performed by hypervisor 132 running on host server 103.

Shown in FIG. 2A are standard command sender 201, registrar 203, networking facility A 205, networking facility B 207, and networking facility C 209. Sender 201, registrar 203, and/or networking facilities 205-209, may, for instance, employ interprocess communications and/or intraprocess communications in interacting with one another. According to the example of FIG. 2A, networking facilities 205-209 may provide indications to registrar 203 of those portions of the standard command set which they are willing to accept, and/or those networking elements with respect to which they are willing to accept commands. The networking facilities may provide such indications periodically, during a startup process (e.g., of hypervisor 132 or host server 103), and/or at some other time. The registrar may store these indications in an accessible storage location.

Sender 201 may send one or more standard commands (e.g., regarding creation, modification, and/or deletion of one or more VLANs, bridges, bonds and/or configurations for NICs) to registrar 203. As examples, such standard commands might correspond to new networking configurations and/or to change to existing networking configurations. Receiving a standard command, registrar 203 may consider the command in light of the command acceptance indications which it has received.

In the case where none of the received indications specify that that the command will be accepted, registrar 203 may signal an error condition to sender 201. In the case where consideration of the received indications finds that only one of networking facilities 205-209 has indicated willingness to accept the command, registrar 203 may pass the command to that networking facility for handling. In the case where consideration of the received indications finds that multiple ones of networking facilities 205-209 have indicated willingness to accept the command, registrar 203 may select from among them a single networking facility and then pass the command to that networking facility for handling. As one example, registrar 203 may take specified preference into account in selecting that single networking facility. Such specified preference might be sent from sender 201 to registrar 203 (e.g., at the time of sending the standard command and/or at some other time) and/or specified during a configuration operation. As another example, registrar 203 might employ one or more criteria and/or apply one or more approaches in selecting the single networking facility (e.g., registrar 203 might randomly choose a networking facility, select the networking facility known to be most capable (e.g., based on performance statistics compiled by and/or accessible by the registrar), and/or select—from among those networking facilitates which have indicated willingness—the one to which registrar 203 has sent the most commands in the past).

Having received a standard command, a networking facility may, for example, perform operations to comply with the command. For instance, the networking facility may create, load, and/or modify one or more components (e.g., userspace and/or non-userspace components, and/or kernel modules) and/or create, load, and/or modify one or more configuration files. As illustrations, such operations may serve to create, modify, and/or delete a VLAN bridge, bond and/or configurations for a NIC. As another example, the networking facility which has received the standard command may pass the command to another networking facility. In this vein, in the example of FIG. 2A networking facility 207 is shown passing to networking facility 209 a command which networking facility 207 has received from register 203. Such a scenario might transpire, for instance, where a networking facility has indicated a willingness to accept a command which it cannot by itself handle, the networking facility having done so with the intention that it would subdelegate handling of the command by passing the command to one or more other networking facilities. Such functionality might, for instance, involve such subdelegation being set during a configuration operation. Such functionality might, for instance, involve networking facility 207 learning of networking facility 209's ability to handle one or more commands which networking facility 207 was, itself, not capable of handling. Networking facility 207 might so learn by receiving an indication of such from networking facility 209 and/or by accessing a storage location.

One or more of networking facilities 205-209 may, for instance, employ different approaches in responding to a given standard command so long as an adopted approach results in meeting that which is called for by the command. As examples, one networking facility might employ a legacy approach to meet a standard command while another networking facility might employ an approach a newer and/or more efficient approach to meet that standard command. Furthermore, as one example a networking facility might act only with regard to one particular type of network element (e.g., switch). As another example, a networking facility may handle multiple types of network element. Also, as an example the establishment of the implementation of a networking configuration may make use of multiple networking facilities (e.g., both of networking facility 207 and networking facility 209 might be employed, and/or both of a networking facility employing a legacy approach and a networking facility employing a non-legacy approach).

Moreover, as noted a networking facility may indicate to registrar 203 those standard commands which it is willing to accept. As such, a given networking facility might be capable of itself handling only a subset of the totality of standard commands. As an example, there may be a first networking facility which handles, say, a small subset of the standard commands and one or other networking facilities that handles at least the others of the commands, with the first networking facility being, say, particularly efficient at handling that small subset. According an example, the operations discussed hereinabove as being performed by registrar 203 might instead be performed by sender 201. According to another example, the operations discussed hereinabove as being performed by registrar 203 might instead be performed by one or more of networking facilities 205-209.

Figure 2B:
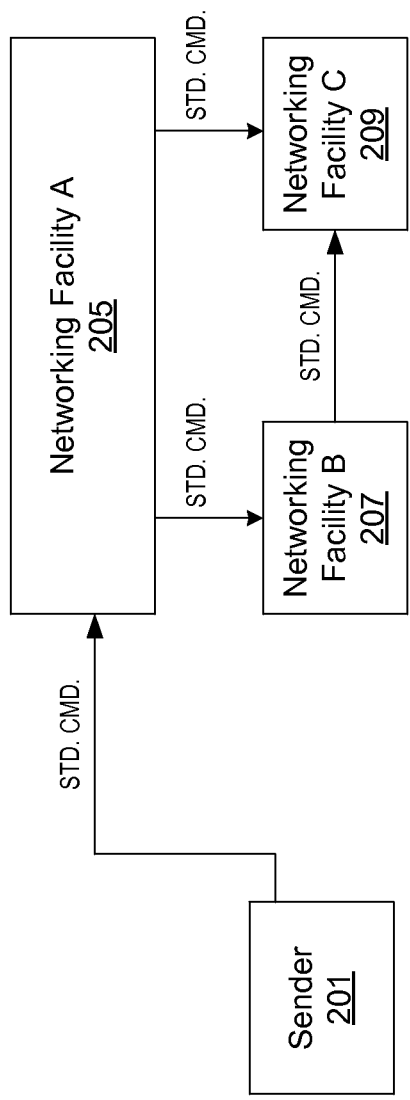
FIG. 2B illustrates a standard command handling approach, according to a further example.

FIG. 2B illustrates another example of a standard command handling approach. The approach may be performed by processing logic that comprises hardware (e.g., circuitry, dedicated logic, programmable logic, microcode, etc.), software (such as instructions run on a processing device), or a combination thereof. As one example, the approach may be performed by hypervisor running on a computing device. For instance, the method may be performed by hypervisor 132 running on host server 103.

Shown in FIG. 2B are standard command sender 201 networking facility A 205, networking facility B 207, and networking facility C 207209. The example of FIG. 2B operates generally in the way of the example of FIG. 2A. The differences will now be discussed. According to the example of FIG. 2B, the operations discussed in connection with registrar 203 are not performed, and networking facility 205, rather than registrar 201, is the recipient of the commands sent by sender 201. Where networking facility 205 receives a command which it cannot by itself but which can be handled by one of networking facility 207 and networking facility 209, networking facility forwards the command to such networking facility for handling. In the vein of the subdelegation discussed in connection with FIG. 2A, the networking facility to which networking facility 205 sends a command might be set during a configuration operation, and/or might involve networking facility 205 learning of the command-handing abilities of networking facility 207 and networking facility 209. In the case where networking facility 205 receives a command which it cannot, itself, handle, and which can also be handed by neither of networking facility 207 and networking facility 209, networking facility 205 may signal an error condition to sender 201.

According to an example, networking abstraction components may be employed to represent networking configurations, with such representation being decoupled from the actual implementation of such a networking configuration.

Figure 3:
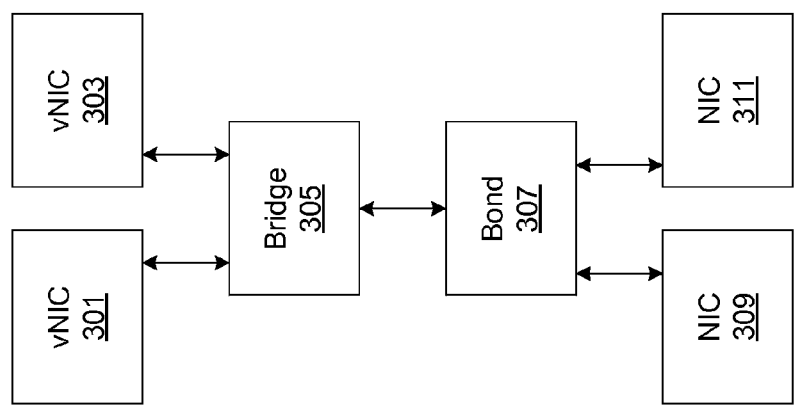
FIG. 3 shows a networking configuration involving virtual network interface cards of a virtual machine, according to an example.

Shown in FIG. 3 is an example of networking configuration involving the VNICs of a virtual machine, the networking configuration being presented to the virtual machine by its host. In FIG. 3, VNICs 301 and 303 of the virtual machine are connected to virtual bridge 305. Bridge 305 is in turn connected to bond 307, a bonding together of NICs (e.g., Ethernet cards) 309 and 311 of the host. Moreover, a VLAN is applied to the bond, and the VNICs enjoy this VLAN via their connection to the bond via bridge 305.

An implementation underlies this networking configuration. For instance, corresponding to the host NICs—and likewise to the bond, the bridge, and the VLAN—may be one or more kernel modules and/or configuration files. The use of the networking abstraction components discussed herein allows for the representation of this networking configuration in a fashion decoupled from the noted implementation.

Figure 4:
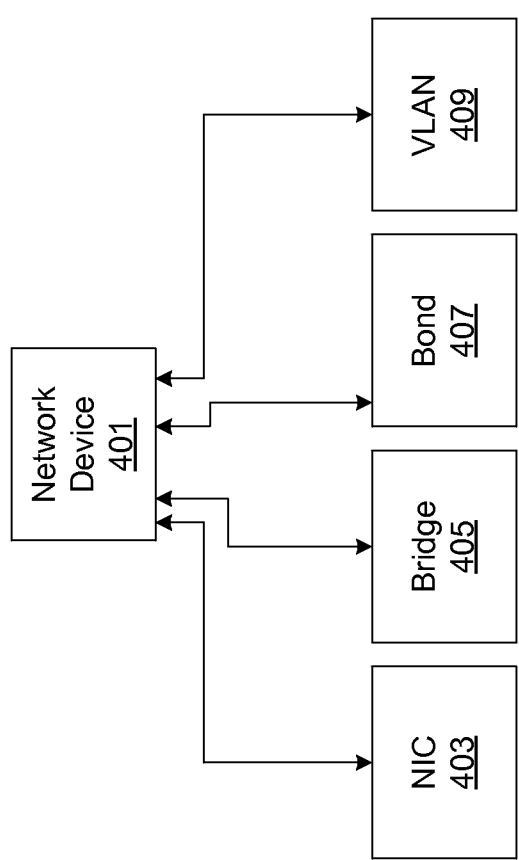
FIG. 4 illustrates a networking abstraction component hierarchy, according to an example.

FIG. 4 illustrates one example of networking abstraction component hierarchy. Shown in FIG. 4 are networking abstraction components 401-409. According to the example of FIG. 4, networking abstraction component 401, networking device, has capabilities of holding name data, network address data, netmask data, gateway data, data regarding whether or not Dynamic Host Configuration Protocol (DHCP) is to be employed, data regarding whether or not a static network address is to be employed, data regarding whether or not there is to be use of asynchronous dynamic network address configuration, and/or Maximum Transmission Unit (MTU) data, and/or has functionality capability corresponding to sending standard commands (e.g., regarding creation, modification, and/or deletion), functionality capability corresponding to validating received configuration requests, and/or functionality capability corresponding to responding to received information requests.

FIG. 4 depicts networking abstraction components 403-409 beneath networking abstraction component 401. These networking abstraction component inherit from networking abstraction component 401 the above-noted data holding capabilities and/or functionality capabilities, and may or may not have additional data holding capabilities and/or functionality capabilities Turning to networking abstraction component 403, network interface card (NIC), this networking abstraction component inherits the above-discussed data holding capabilities and functionality capabilities, but does not have additional data holding capabilities and/or functionality capabilities. Turning to networking abstraction component 405, bridge, this networking abstraction component inherits the above-discussed data holding capabilities and functionality capabilities, and also has additional data holding capabilities. The additional data holding capabilities are the capability of holding data regarding the connections of the ports of the bridge (e.g., indicating connections to bonds and/or NICs, indicating that the bridge is a virtual NIC (vNIC)-only bridge, and/or indicating that connections of the bridge correspond to VLANs), the capability of holding forward delay data, and/or the capability of holding Spanning Tree Protocol (STP) data.

Turning to networking abstraction component 407, bond, this networking abstraction component inherits the above-discussed data holding capabilities and functionality capabilities, and also has additional data holding capabilities. The additional data holding capabilities are the capability of holding data indicating the entities (e.g., NICs and/or VLANs) which are being bonded together by the bond, and/or the capability of holding data (e.g., expressed in terms of dictionary key-value pairs) regarding settable options for the bond (e.g., link monitoring frequency time, and/or specification of protocols —for instance concerning balancing and/or active standby—being employed for the entities which are being bonded together by the bond).

Turning to networking abstraction component 409, VLAN, this networking abstraction component inherits the above-discussed data holding capabilities and functionality capabilities, and also has additional data holding capabilities. The additional data holding capabilities are the capability of holding VLAN tag data, and/or data indicating the entity—for instance a NIC, bond, or bridge—to which the VLAN is applied.

Returning to FIG. 3, a NIC networking abstraction component may be employable to represent each of NICs 309 and 311, each networking abstraction component holding, for instance, data regarding the IP address and gateway of the NIC, and with the networking abstraction component's functional capability employable to send standard commands leading, for example, to the loading and/or modification of one or more kernel modules and/or configuration files of the corresponding underling implementation. In like vein, a bond networking abstraction component may be employable to represent bond 307, the networking abstraction component holding, for instance, data indicating that NICs 309 and 311 are bonded together by the bond, and with the networking abstraction component's functional capability employable to send standard commands leading, for example, to the loading and/or modification of one or more kernel modules and/or configuration files of the corresponding underling implementation.

A bridge networking abstraction component may be employable to represent bridge 305, the networking abstraction component holding, for instance, data indicating that the bridge has port connections to bond 307 and to vNICs 301 and 303, and with the networking abstraction component's functional capability employable to send standard commands leading, for example, to the loading and/or modification of one or more kernel modules and/or configuration files of the corresponding underling implementation. A VLAN networking abstraction component may be employable to represent the noted VLAN, the networking abstraction component holding, for instance, the tag of the VLAN, indication that the VLAN is applied to bond 307, and with the networking abstraction component's functional capability employable to send standard commands leading, for example, to the loading and/or modification of one or more kernel modules and/or configuration files of the corresponding underling implementation.

A networking abstraction component may have functionality capability corresponding to validating received requests. In connection with the establishment of a representation of a networking configuration one or more networking abstraction components may receive requests to adopt properties which will allow for the networking configuration to be established. For instance, as discussed networking abstraction components may be employed to represent the elements of the networking configuration of FIG. 3, each such networking abstraction component holding, for example, certain data. Such networking abstraction components may receive (e.g., via interprocess communication and/or intraprocess communication) requests to adopt that data. For instance, the networking abstraction component for bridge 305 may receive a request to adopt the above-noted properties such as that it have connection to bond 307 and to vNICs 301 and 303. In validating the request the networking abstraction component may check the implementability of the request.

For example, the networking abstraction component might find a request to have port connections to bond 307 and to VNICs 301 and to 303 acceptable, but, say, find a request to have a port connection to a third, non-existent vNIC unacceptable. Moreover, changes may be made to networking configurations, and networking abstraction components may receive requests to adopt properties to permit the changed networking configuration to be established. For instance, returning again to FIG. 3, the networking abstraction component for bond 307 might find a request that it change from being a bridge to being a NIC unacceptable, with the networking abstraction component determining such to lead to an unconfigurable networking configuration.

A networking abstraction component may have functionality capability corresponding to received (e.g., via interprocess communication and/or intraprocess communication) information requests. In response to such a request a networking abstraction component may send (e.g., via interprocess communication and/or intraprocess communication)

information corresponding to its held data. Returning to the example of FIG. 3, the networking abstraction component for bridge 305 may respond to a received information request by returning information including, for instance, indication that it has port connections to bond 307 and to vNICs 301 and 303.

Figure 5:
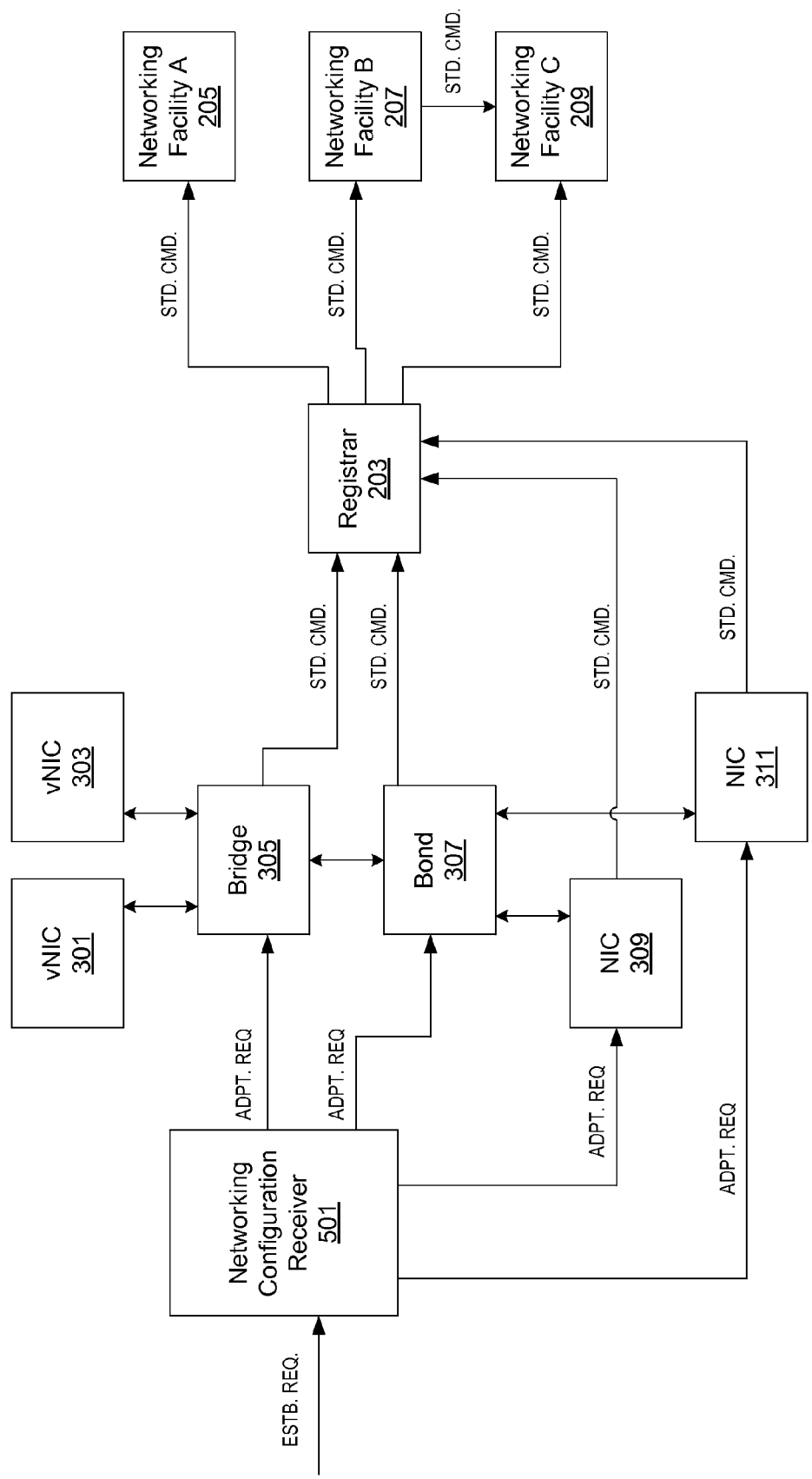
FIG. 5 illustrates a method of producing an implementation underlying a networking configuration, according to an example.
Figure 6:
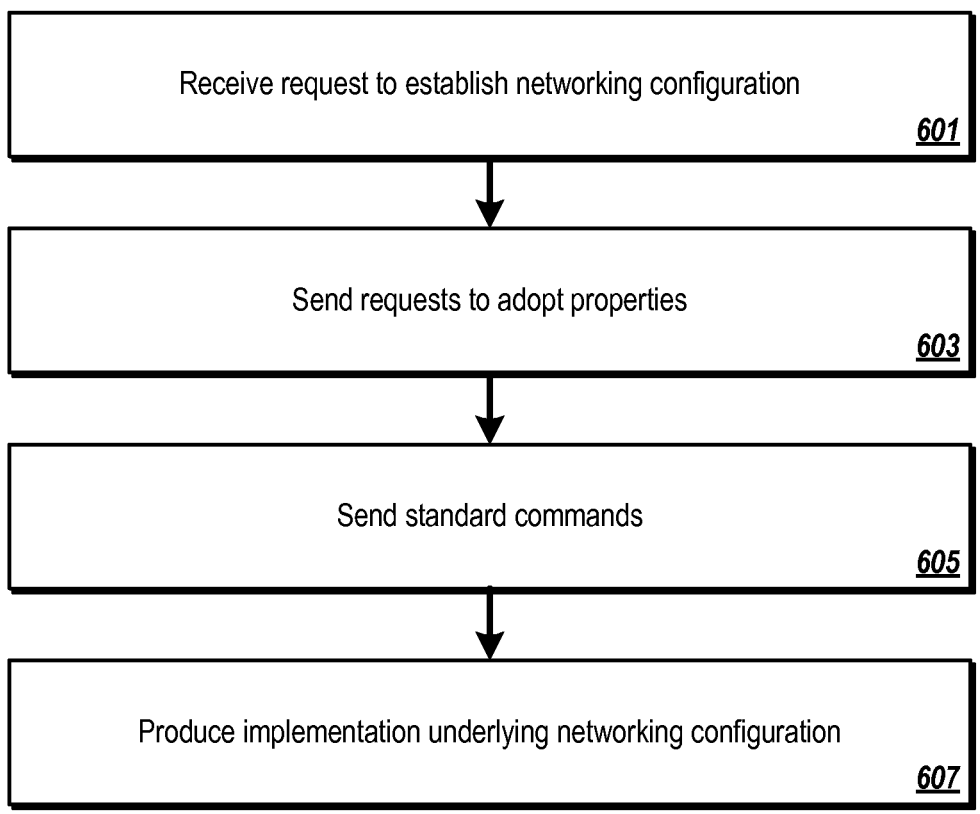
FIG. 6 is a flow diagram illustrating the method of FIG. 5.

FIG. 5 illustrates one example of a method of producing an implementation underlying a networking configuration. FIG. 6 illustrates a flow diagram of this method. The method may be performed by processing logic that comprises hardware (e.g., circuitry, dedicated logic, programmable logic, microcode, etc.), software (such as instructions run on a processing device), or a combination thereof. As one example, the method may be performed by hypervisor running on a computing device. For instance, the method may be performed by hypervisor 132 running on host server 103. It is noted that communications discussed in connection with FIG. 5 may, for instance, employ interprocess communications and/or intraprocess communications.

Shown in FIG. 5 is networking configuration receiver component 501 receiving (e.g., from virtualization manager 114) a request to establish a networking configuration (block 601). As examples, such establishment might correspond to a new networking configuration and/or to a change to an existing networking configuration. The request may include a description of the networking configuration, for instance an indication of the elements of the networking configuration (e.g., one or more bridges, bonds, NICs, and/or VLANs) and/or details regarding elements of the networking configuration (e.g., in the vein of those discussed hereinabove in connection with networking abstraction components, such as data regarding bridge port connections and/or bridge forward delay data).

Networking configuration receiver component 501 may then send one or more requests to adopt properties so as to yield one or more networking abstraction components representing the networking configuration to be established (block 603). The requests to adopt properties may include appropriate relevant details allowing the called for networking abstraction components to set their held data and/or to send appropriate standard commands to yield appropriate underlying implementation. Resultant may be a networking abstraction component for each of elements 305-311. Where the networking configuration to be established includes one or more VLANs, also resultant may be a networking abstraction component for each of the VLANs. It is noted that in the case where a networking abstraction component to which a request to adopt properties is sent does not already exist, the sending may serve to create the networking abstraction component.

Each of the networking abstraction components (e.g., networking abstraction components for each of elements 305-311) may then send to registrar 203 one or more standard commands which will lead to establishment of the networking abstraction component's underlying implementation (block 605). A sent standard command may include a one or more directives (e.g., create, load, and/or modify) and/or one or more details (e.g., in the vein of those discussed hereinabove in connection with abstraction components). As an example, a standard command corresponding to a bridge may include a create directive and data regarding bridge connections and data regarding bridge forward delay). Registrar 203 may act (e.g., in accordance with that which is discussed hereinabove in connection with FIG. 2A) to pass the one or more standard commands to one or more of networking facilities 205-209. Having received a standard command, a networking facility may, for example, perform operations to comply with the command.

As one example there may be a chronological order for the sending of standard commands by at-hand networking abstraction components. For instance, the networking abstraction components may send in an order corresponding to a network topology sequence of the at-hand networking configuration (e.g., with the sending starting with the networking abstraction component corresponding to the topological first and/or top element of the networking configuration). As another example, the networking abstraction components may send according to a randomized sequence. As a further example, the networking abstraction components may be permitted to send at will.

As one example, a networking facility which has finished performing the implementation work requested of it may send a confirmation message. For instance, the networking facility may send the message to a networking element which is sequentially next according to the topology of the at-hand network configuration (e.g., if bond 307 were taken to follow bridge 305 according to network topology, a networking facility finishing implementation work for bridge 305 might send a confirmation message to bond 307). As another example, a networking facility finishing its work might send the confirmation to the registrar, and the registrar might forward the confirmation to such topologically next network element. Such a topologically next network element may, according to an example, await such a confirmation before sending its standard command. According to another example, such a topologically next network element may send its standard command without regard to receipt of such a confirmation. According to additional examples, a networking facility might send a confirmation message to the networking abstraction component for which the networking facility has completed requested implementation work, and/or the networking facility may send the confirmation to registrar 203 and registrar 203 may forward the confirmation to the networking abstraction component for which implementation work has completed. As another example, no confirmation messages might be sent.

With the networking abstraction components for the at-hand networking configuration having sent their standard commands, and with the networking facilities having completed the implementation work called of them, the implementation underlying the networking configuration may be produced (block 607). It is noted that, according to an example, a networking abstraction component may act to establish linkage (e.g., via interprocess communication, intraprocess communication, poll, and/or push) with the produced implementation in order keep some or all of its held data up to date (e.g., in keeping with any corresponding changes arising in underlying implementation). For instance, a networking abstraction component might employ such linkage to keep held data regarding MTU value and/or VLAN tag up to date with the MTU and/or VLAN tag of the underlying implementation, including any changes made thereto.

According to an example, networking abstraction components which have been created may persist. According to another example, networking abstraction components may be recreated when needed (e.g., a networking abstraction component may be recreated responsive to an information request dispatched thereto).

Figure 7:
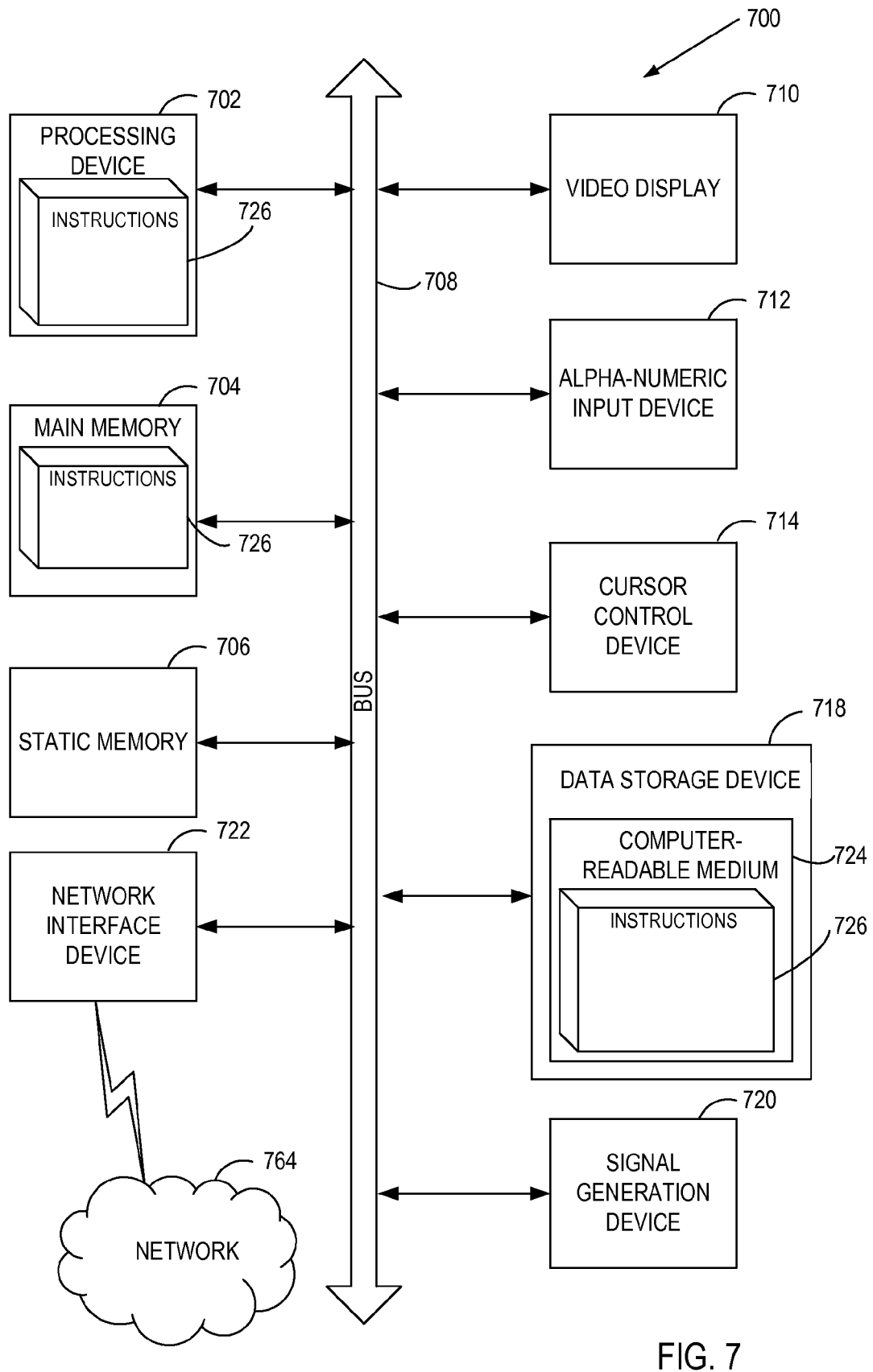
FIG. 7 is a diagrammatic representation of a machine, according to an example.

FIG. 7 illustrates a diagrammatic representation of a machine in the example form of a computing device 700 within which a set of instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 708.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 726) for performing the operations and steps discussed herein.

The computing device 700 may further include a network interface device 722. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a machine-readable storage medium (or more specifically a computer-readable storage medium) 724 on which is stored one or more sets of instructions 726 embodying any one or more of the methodologies or functions described herein. The instructions 726 may also reside, completely or at least partially, within the main memory 704, within the static memory 706 and/or within the processing device 702 during execution thereof by the computer system 700, the main memory 704, static memory 706 and the processing device 702 also constituting computer-readable storage media.

While the computer-readable storage medium 724 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
receiving, by a processing device, a first request to establish a networking configuration in a virtualization environment, the networking configuration to provide network access to a virtual machine executed by the processing device, wherein the first request comprises a description of the networking configuration that includes one or more network elements of the networking configuration and data regarding the one or more network elements;
creating one or more networking abstraction components corresponding to the one or more network elements in the description;
sending a second request to the one or more networking abstraction components to 1) adopt properties to hold the data associated with the respective one of the one or more networking abstraction components, 2) instruct the respective one of the one or more networking abstraction components to send one or more standard commands, or 3) both, to provide an establishment of an implementation of the networking configuration according to the description;
sending, by the processing device via the one or more networking abstraction components, the one or more standard commands; and
producing, in response to the standard commands, the implementation corresponding to the networking configuration.

2. The method of claim 1, wherein one or more of:
the one or more networking abstraction components comprise one or more of a network interface card networking abstraction component, a bond networking abstraction component, a bridge networking abstraction component, or a virtual local area network networking abstraction component, or one or more of the networking abstraction components exhibit networking abstraction component inheritance.

3. The method of claim 1, wherein two or more networking facilities are employed in the implementation production, wherein a first of the two or more networking facilities subdelegates handling of one or more standard commands to a second of the two or more networking facilities.

4. The method of claim 1, wherein one or more networking facilities are employed, and wherein the one or more networking facilities indicate to a registrar acceptable standard commands.

5. The method of claim 1, wherein the networking abstraction components perform validation with respect to the second request to adopt properties corresponding to the networking configuration.

6. The method of claim 1, further comprising:
receiving, via the one or more networking abstraction components, one or more information requests; and
sending, via the one or more networking abstraction components, one or more responses to the one or more information requests, wherein the responses include networking abstraction component-held data.

7. The method of claim 1, further comprising:
receiving a third request to change the networking configuration; and
informing the one or more networking abstraction components of the change.

8. An apparatus, comprising:
a memory; and
a processing device communicably coupled to the memory, the processing device to execute instructions to:
receive a first request to establish a networking configuration in a virtualization environment, the networking configuration to provide network access to a virtual machine executed by the processing device, wherein the first request comprises a description of the networking configuration that includes one or more network elements of the networking configuration and data regarding the one or more network elements;
create one or more networking abstraction components corresponding to the one or more network elements in the description;
send a second request to the one or more networking abstraction components to 1) adopt properties to hold the data associated with the respective one of the one or more networking abstraction components, 2) instruct the respective one of the one or more networking abstraction components to send one or more standard commands, or 3) both, to provide an establishment of an implementation of the networking configuration according to the description;
send, via the one or more networking abstraction components, the one or more standard commands; and
produce, in response to the standard commands, the implementation corresponding to the networking configuration.

9. The apparatus of claim 8, wherein one or more of:
the one or more networking abstraction components comprise one or more of a network interface card networking abstraction component, a bond networking abstraction component, a bridge networking abstraction component, or a virtual local area network networking abstraction component, or one or more of the networking abstraction components exhibit networking abstraction component inheritance.

10. The apparatus of claim 8, wherein two or more networking facilities are employed in the implementation production, wherein a first of the two or more networking facilities subdelegates handling of one or more standard commands to a second of the two or more networking facilities.

11. The apparatus of claim 8, wherein one or more networking facilities are employed, and wherein the one or more networking facilities indicate to a registrar acceptable standard commands.

12. The apparatus of claim 8, wherein the networking abstraction components perform validation with respect to the second request to adopt properties corresponding to the networking configuration.

13. The apparatus of claim 8, wherein the processing device further executes instructions to:
receive, via the one or more networking abstraction components, one or more information requests; and
send, via the one or more networking abstraction components, one or more responses to the one or more information requests, wherein the responses include networking abstraction component-held data.

14. The apparatus of claim 8, wherein the processing device further executes instructions to:
receive a third request to change the networking configuration; and
inform the one or more networking abstraction components of the change.

15. A non-transitory machine-readable storage medium storing instructions which, when executed, cause a processing device to:
receive, by the processing device, a first request to establish a networking configuration in a virtualization environment, the networking configuration to provide network access to a virtual machine executed by the processing device, wherein the first request comprises a description of the networking configuration that includes one or more network elements of the networking configuration and data regarding the one or more network elements;
create one or more networking abstraction components corresponding to the one or more network elements in the description;
send a second request to the one or more networking abstraction components to 1) adopt properties to hold the data associated with the respective one of the one or more networking abstraction components, 2) instruct the respective one of the one or more networking abstraction components to send one or more standard commands, 3) or both, to provide an establishment of an implementation of the networking configuration according to the description;
send, by the processing device, via the one or more networking abstraction components, the one or more standard commands; and
produce, in response to the standard commands, the implementation corresponding to the networking configuration.

16. The non-transitory machine-readable storage medium of claim 15, wherein one or more of:
the one or more networking abstraction components comprise one or more of a network interface card networking abstraction component, a bond networking abstraction component, a bridge networking abstraction component, or a virtual local area network networking abstraction component, or one or more of the networking abstraction components exhibit networking abstraction component inheritance.

17. The non-transitory machine-readable storage medium of claim 15, wherein two or more networking facilities are employed in the implementation production, wherein a first of the two or more networking facilities subdelegates handling of one or more standard commands to a second of the two or more networking facilities.

18. The non-transitory machine-readable storage medium of claim 15, wherein the networking abstraction components perform validation with respect to the second request to adopt properties corresponding to the networking configuration.

19. The non-transitory machine-readable storage medium of claim 15, wherein the processing device further to:
   receive, via the one or more networking abstraction components, one or more information requests; and
   send, via the one or more networking abstraction components, one or more responses to the one or more information requests, wherein the responses comprise networking abstraction component-held data.

20. The non-transitory machine-readable storage medium of claim 15, wherein the processing device further to:
   receive a third request to change the networking configuration; and
   informing the one or more networking abstraction components of the change.

* * * * *